United States Patent
Chen et al.

(10) Patent No.: US 11,362,926 B2
(45) Date of Patent: Jun. 14, 2022

(54) DYNAMIC WIRELESS NETWORK SELECTIONS

(71) Applicant: HEWLETT-PACKARD DEVELOPMENT COMPANY, L.P., Houston, TX (US)

(72) Inventors: Chung-Chun Chen, Taipei (TW); Yi-Kang Hsieh, Taipei (TW); Ming-Shien Tsai, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 908 days.

(21) Appl. No.: 16/076,467

(22) PCT Filed: Apr. 24, 2017

(86) PCT No.: PCT/US2017/029203
§ 371 (c)(1),
(2) Date: Aug. 8, 2018

(87) PCT Pub. No.: WO2018/199905
PCT Pub. Date: Nov. 1, 2018

(65) Prior Publication Data
US 2021/0203583 A1 Jul. 1, 2021

(51) Int. Cl.
*H04L 43/50* (2022.01)
*H04L 43/10* (2022.01)
(Continued)

(52) U.S. Cl.
CPC ............ *H04L 43/50* (2013.01); *H04L 43/045* (2013.01); *H04L 43/10* (2013.01); *H04L 41/12* (2013.01); *H04L 41/22* (2013.01)

(58) Field of Classification Search
CPC ......... H04L 43/50; H04L 43/10; H04L 41/22; H04L 41/12; H04L 43/045; H04W 72/08;
(Continued)

(56) References Cited

U.S. PATENT DOCUMENTS 7,116,970 B2 10/2006 Brusilovsky et al.
7,496,661 B1 2/2009 Morford et al.
(Continued)

FOREIGN PATENT DOCUMENTS

CN 101136791 A 3/2008
CN 101808386 A 8/2010

OTHER PUBLICATIONS

Ahuja et al., "Network Selection Based On Available Link Bandwidth In Multi-access Networks", Digital Communications and Networks, vol. 2, 2016, pp. 15-23.

*Primary Examiner* — Glenton B Burgess
*Assistant Examiner* — Rachel J Hackenberg
(74) *Attorney, Agent, or Firm* — Brooks, Cameron & Huebsch PLLC (57) ABSTRACT

Example implementations relate to dynamic wireless network selection. In some examples, a computing device may comprise a processing resource and a memory resource storing machine-readable instructions to determine a computing device is executing a number of applications, classify the number of applications, prioritize the number of applications based on the classification of the number of applications, determine at least one test from a plurality of tests to send to a network based on the prioritization of the applications, perform the at least one test from the plurality of tests, and determine a network adapter of the network to be used by the device based on the at least one test performed.

15 Claims, 3 Drawing Sheets

(51) Int. Cl.
  *H04L 43/045* (2022.01)
  *H04L 41/12* (2022.01)
  *H04L 41/22* (2022.01)

(58) Field of Classification Search
  CPC ....... H04W 16/18; H04W 8/08; H04W 8/205; H04W 24/08
  See application file for complete search history.

(56) References Cited

U.S. PATENT DOCUMENTS

| | | | |
|---|---|---|---|
| 7,797,406 | B2 | 9/2010 | Patel et al. |
| 7,843,843 | B1 | 11/2010 | Papp, III et al. |
| 8,165,589 | B2 | 4/2012 | Lin |
| 8,750,263 | B2 | 6/2014 | Kezys et al. |
| 2004/0006602 | A1 | 1/2004 | Bess et al. |
| 2005/0059397 | A1 | 3/2005 | Zhao |
| 2005/0132301 | A1 | 6/2005 | Ikeda et al. |
| 2006/0198359 | A1* | 9/2006 | Fok ........ H04W 24/10 370/351 |
| 2008/0062934 | A1* | 3/2008 | Zhao ........ H04W 48/18 370/332 |
| 2009/0067372 | A1* | 3/2009 | Shah ........ H04L 47/31 370/328 |
| 2009/0177801 | A1* | 7/2009 | Chambers, Jr. ........ H04W 48/16 709/250 |
| 2011/0286437 | A1* | 11/2011 | Austin ........ H04W 72/0413 370/338 |
| 2012/0122461 | A1* | 5/2012 | Hossain ........ H04W 72/085 455/450 |
| 2013/0205366 | A1 | 8/2013 | Luna et al. |
| 2013/0329666 | A1* | 12/2013 | Degani ........ H04W 48/16 370/329 |
| 2015/0117213 | A1* | 4/2015 | Pinheiro ........ H04W 48/06 370/235 |
| 2015/0373574 | A1* | 12/2015 | Gordon ........ H04L 41/5067 370/252 |

\* cited by examiner

DYNAMIC WIRELESS NETWORK SELECTIONS

BACKGROUND

Computing devices such as mobile phones, personal computers, etc. connected to a base station and access point at the same time via a wireless wide area network (WWAN) and a wireless local area network (WLAN) can utilize the WLAN by default automatically. For example, when a computing device is connected to a WLAN a default setting of the computing device can switch to the WLAN when the computing device was previously connected to a WWAN.

DETAILED DESCRIPTION

A number of systems and methods for dynamic wireless network selections are described herein. In some examples, a user may attempt to execute several applications at one time on a computing device. In some examples, a user may attempt to change locations while executing at least one application on the computing device. In both instances, there may be a network adapter that achieves a relatively higher quality compared to another available network adapter. That is, the computing device may be able to switch from the default network adapter to another available network adapter that would achieve a relatively higher quality.

A computing device may include a processing resource such as electronic circuitry to execute instructions stored on machine-readable medium to perform various operations. Computing devices may be static or mobile. A static computing device may include a computing device designed for regular use in a single location. For example, a static computing device may include a desktop computer or other computing device that is utilized in a single location. A mobile computing device may include a portable computing device that is designed to be used in a variety of settings and to be transported between the two with relatively little effort. A mobile computing device may combine inputs, outputs, components, and capabilities that are otherwise separate in a static computing device. A mobile computing device may include a laptop computer, smartphone, other smart device, a tablet computer, a personal digital assistant, a convertible laptop, etc.

A user of a computing device may execute a number of applications on their computing device, such as sending data, making instant calls, sending instant messages, etc. In some instances, when the user is in a public area and attempts to join an instant call the computing device may use WLAN by default. However, by using WLAN the computing device may encounter a number of issues. A user may encounter disrupted audio or in some instances may not be able to connect to the instant call server at all. These problems may be due to a weak WLAN signal, high backbone latency. WLAN radio frequency (RF) interference, or an access point (AP) controller limiting performance due to low authority. In most cases, a user has to disable the WLAN or disconnect the WLAN connection to the AP manually. Disabling the WLAN or manually disconnecting the WLAN connection allows the user to use WWAN and achieve a better quality compared to the WLAN connection.

In another instance, a user may attempt to run a number of applications while moving from one area to another. Roaming is a scenario for wireless technology, but during/after the roaming, the computing device may encounter problems with the signal quality. A user may encounter disrupted audio or in some instances may not be able to connect to the instant call server at all upon moving to another space. These problems may be due to the user entering an area where there is uncovered or weak WLAN or WWAN signal in that area.

While a user runs a number of applications, the computing device, through the use of a daemon, can ping a server several times as well as send a few bytes to the server by all available network adapters. A daemon is a computer program that a computing device can execute as a background process. Available network adapters may include Ethernet, WLAN, WWAN, WIGIG. A computing device is able to determine which network adapter of the available network adapters has the shortest response time and which network adapter of the available network adapters has the fastest throughput. The computing device may then switch to the network adapter with a relatively shorter (e.g., shortest compared to other network adapters, etc.) response time for instant messages/instant calls or the network adapter with a relatively faster (e.g., fastest compared to other network adapters, etc.) throughput for data uploading and downloading.

Additionally, in the case that a user moves to a location where there is uncovered or weak WLAN, the computing device, through use of the daemon, may perform a ping and/or a FTP TpT test to determine whether the computing device should switch to a different network adapter, such as WWAN.

The figures herein follow a numbering convention in which the first digit corresponds to the drawing figure number and the remaining digits identify an element or component in the drawing. Elements shown in the various figures herein may be capable of being added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

Figure 1:
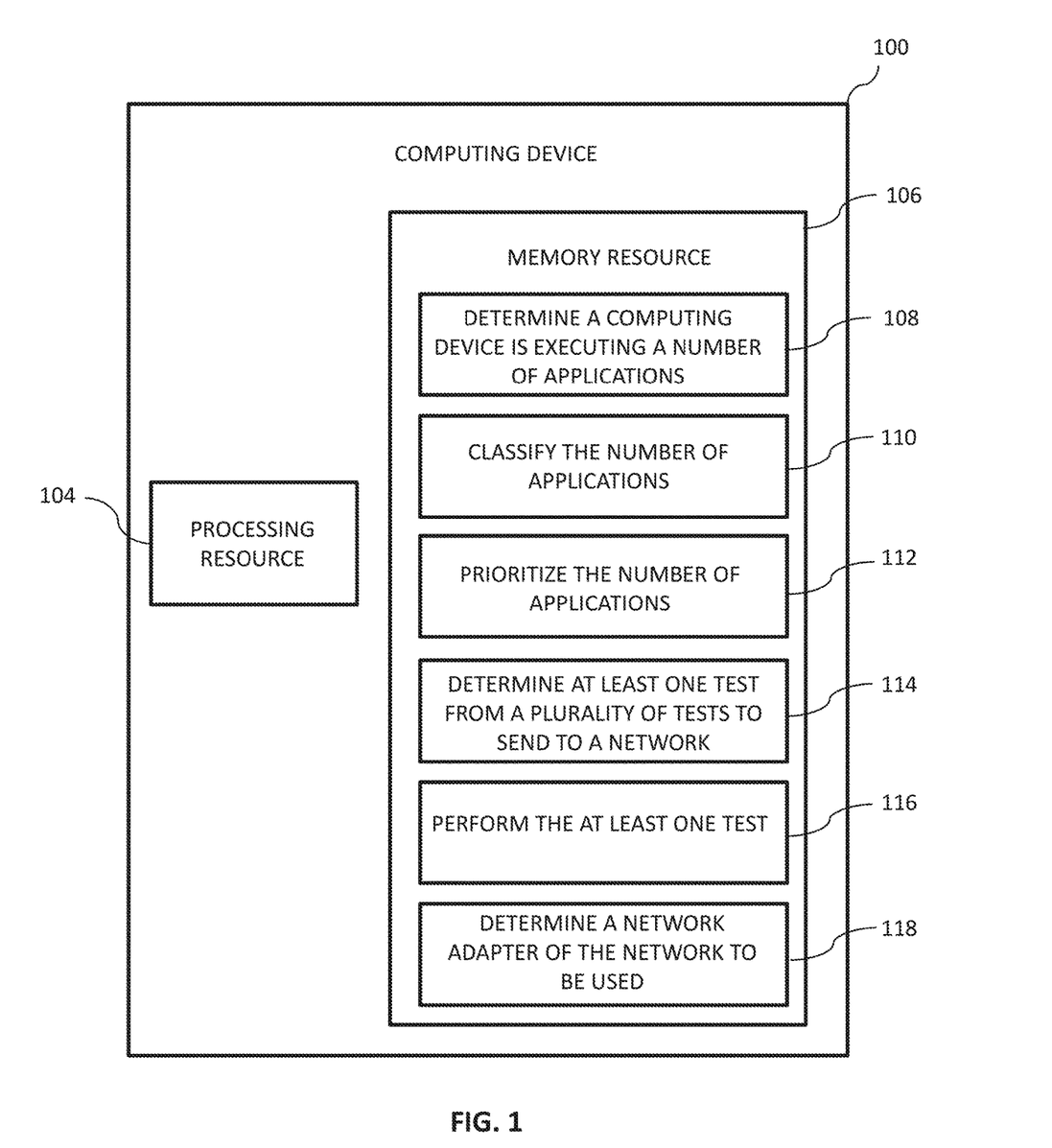
FIG. 1 is an example of a computing device consistent with the present disclosure.

FIG. 1 illustrates an example of a computing device 100 for dynamic wireless network selection according to the present disclosure. The computing device 100 can be, for example, a laptop computer, a desktop computer, or a mobile device, among other types of computing devices. As illustrated in FIG. 1, the computing device 100 can include a processing resource 104. The computing device 100 may further include a memory resource 106 coupled to the processing resource 104, on which instructions may be stored, such as instructions 108, 110, 112, 114, 116, and 118. Although the following descriptions refer to a single processing resource and a single memory resource, the descriptions may also apply to a system with multiple processing resources and multiple memory resources. In such examples, the instructions may be distributed (e.g., stored) across multiple memory resources and the instructions may be distributed (e.g., executed by) across multiple processing resources.

Processing resource 104 may be a central processing unit (CPU), a semiconductor based microprocessor, and/or other hardware devices suitable for retrieval and execution of instructions stored in memory resource 106. Processing resource 104 may fetch, decode, and execute instructions 108, 110, 112, 114, 116, and 118 or a combination thereof. As an alternative or in addition to retrieving and executing instructions, processing resource 104 may include at least one electronic circuit that includes electronic components for performing the functionality of instructions 108, 110, 112, 114, 116, and 118, or a combination thereof.

Memory resource 106 can be volatile or nonvolatile memory. Memory resource 106 can also be removable (e.g., portable) memory, or non-removable (e.g., internal) memory. For example, memory resource 106 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disk read-only memory (CD-ROM), flash memory, a laser disc, a digital versatile disk (DVD) or other optical disk storage, and/or a magnetic medium such as magnetic cassettes, tapes, or disks, among other types of memory.

Instructions 108, when executed by processing resource 104, may cause the processing resource 104 to determine a computing device 100 is executing a number of applications. In some examples, the computing device may execute a daemon that can determine the number of applications being performed on the computing device 100. For example, the daemon may contact an operating system (OS) application programming interface (API) to determine how many (e.g., quantity, etc.) applications the computing device 100 is executing. Once the daemon determines the computing device 100 is executing a number of applications, the daemon may classify the number of applications, as described herein.

Instructions 110, when executed by processing resource 104, may cause the processing resource 104 to classify the number of applications. In some examples, the computing device 100 may execute a daemon that may classify the number of applications that the computing device 100 is executing at a specific time. For example, a first application from the number of applications may be classified as an instant application and a second application from the number of applications may be classified as a non-instant application. Instant applications can include making an instant call and sending an instant message. Non-instant applications can include data upload and download.

As described herein, a user may attempt to execute several applications at one time on the computing device 100. In another instance, a user may attempt to change locations while executing at least one application on the computing device 100. In both instances, there may be a network adapter that achieves a relatively higher quality compared to another available network adapter. That is, the computing device 100 may be able to switch from the default network adapter to another available network adapter that would achieve a relatively higher quality. Determining which network adapter would achieve a relatively higher quality may depend on the classification of the at least one application the computing device 100 is executing. For example, one network adapter may achieve a higher quality for an application classified as instant than the same network adapter would perform for an application classified as non-instant.

Furthermore, as described herein, there are a number of tests that may be performed in order to determine which one of the available network adapters would achieve a relatively higher quality compared to the other available network adapters. Determining at least one test from a plurality of tests may be performed may be based on the classification of the at least one application that the computing device 100 is attempting to execute. For example, when a computing device is executing an application that is classified as an instant application, a ping test may be performed. Further, when a computing device 100 is executing an application that is classified as a non-instant application, a file transfer protocol throughput (FTP TpT) test may be performed.

Instructions 112, when executed by processing resource 104, may cause the processing resource 104 to prioritize the number of applications. For example, prioritizing the number of applications can be based on the classification of the number of applications. In some examples, a daemon that is being executed by the computing device 100 may prioritize the number of applications based on each application's classification. For example, an instant application may have a higher priority than a non-instant application.

As described herein, the computing device 100 may attempt to execute several applications at one time. In an instance that the computing device 100 is attempting to execute multiple applications at one time, prioritization of the multiple applications may be used to determine the at least one test that is performed to determine which of the available network adapters the computing device 100 uses. For example, in an instance where the computing device 100 is attempting to execute both an application classified as instant and an application classified as non-instant, the application classified as instant may be given a higher priority than the application classified as non-instant. That is, the test performed may be a test to determine which network adapter will achieve a higher quality for the application that is given a higher priority.

For example, in an instance where the computing device 100 is executing at least one application classified as instant and at least one application classified as non-instant simultaneously, the applications classified as instant can have a higher priority than the applications classified as non-instant. Thus, when determining which network adapter of the available network adapters to use, the network device that may achieve a higher quality for the applications classified as instant can be used over a network device that may achieve a higher quality for the applications classified as non-instant.

Instructions 114, when executed by processing resource 104, may cause the processing resource to determine at least one test from a plurality of tests to send to a network. For example, the plurality of tests may include a ping test and a FTP TpT test. In some examples, determining that at least one test from the plurality of tests to send to the network may be based on the prioritization of the number of applications that the computing device 100 is executing. As previously described, an application that is classified as instant may have a higher priority than an application that is classified as non-instant.

In some examples, instructions 114 may include instructions to determine at least one test from the plurality of tests to send to the network based on an occurrence of roaming as the number of applications are being executed by the computing device 100. For example, a daemon may determine at least one test from the plurality of tests to send to the network as a result of the computing device 100 moving to a an uncovered or weak WLAN or WWAN signal area. An uncovered area can be an area where there is not a WLAN or a WWAN signal.

In some examples, instructions 114 may include instructions to determine that a ping test packet may be sent to the network as a result of the computing device executing an instant application. A ping test may determine the response time of each of the available network adapters. Thus, a ping test may be used to determine the network adapter of the network with a shorter response time compared to other network adapters of the network.

In another example, instructions 114 may include instructions to determine that a FTP TpT test packet may be sent to the network as a result of the computing device executing a non-instant application. A FTP TpT test may determine the throughput speed of each of the available network adapters. Thus, a FTP TpT may be used to determine the network adapter of the network with a faster throughput compared to other network adapters of the network.

A daemon can send a ping test packet and/or a FTP TpT test packet to the network upon the daemon detecting the computing device 100 is executing a number of instant and/or non-instant applications. In some examples, a ping test packet is sent to the network in response to the computing device 100 executing an instant application. For example, when a daemon determines that a computing device 100 is executing both an instant and a non-instant application, the daemon may determine that a ping test packet may be sent to the network. That is, because the application that has been classified as instant has a higher priority than the application that has been classified as non-instant, the daemon will select a test that will determine which of the available network adapters can achieve a higher quality for the applications given a higher priority.

In another example, where a user moves to an uncovered or weak WLAN or WWAN signal area, the computing device may determine which test from a plurality of tests to perform based on the classification and prioritization of the applications the computing device 100 is attempting to execute at the time the user enters the uncovered or weak WLAN or WWAN signal area. That is, the computing device 100 can determine which test will determine the network adapter that will achieve a higher quality compared to other available network adapters for the application that has been given a higher priority at the moment the user enters the uncovered or weak WLAN or WWAN signal area.

Instructions 116, when executed by processing resource 104, may cause the processing resource to perform the at least one test. In some examples, a ping test may be performed as a result of the computing device 100 executing an instant application. For example, a ping test may be performed in response to a daemon sending a ping test packet to the network. In some examples, a FTP TpT test may be performed as a result of the computing device 100 executing a non-instant application. For example, a FTP TpT test may be performed in response to a daemon sending a FTP TpT test packet to the network.

As described herein, a user may attempt to execute several applications at one time on the computing device 100. In an instance that a user is attempting to execute multiple applications at one time on the computing device 100, performing at least one test can be used to determine which of the available network adapters will achieve a higher quality than the other available network adapters.

In another example, a user may attempt to execute at least one application using the computing device 100 while roaming. In some instances, while the user is roaming they may enter an uncovered or weak WLAN or WWAN signal area. Upon entering the uncovered or weak WLAN or WWAN signal area, the computing device 100, through the use of a daemon, can perform at least one test to determine which of the available network adapters will achieve a higher quality that the other available network adapters. As described herein, the computing device 100 will determine which of the plurality of tests to perform based on the classification and prioritization of the applications the computing device 100 is attempting to execute.

Instructions 118, when executed by processing resource 104, may cause the processing resource to determine a network adapter of the network to be used. For example, the network adapter of the network to be used by the device may be based on the at least one test performed.

As described herein, a user may attempt to execute several applications at one time on the computing device 100. In an instance that a user is attempting to execute multiple applications at one time on the computing device 100, there may be a network adapter of the network that will achieve a higher quality than the network adapter that the computing device 100 utilizes by default. That is, there may be a network adapter of the network that will achieve a higher quality compared to other available network adapters.

In another example, a user may attempt to execute at least one application using the computing device 100 while roaming. In some instances, while the user is roaming they may enter an uncovered or weak WLAN or WWAN signal area. In an instance that a user enters an uncovered or weak WLAN or WWAN signal area while attempting to execute at least one application on the computing device 100, there may be a network adapter of the network that will achieve a higher quality than the network adapter that the computing device 100 utilizes by default. That is the computing device 100 may switch to another available network adapter of the network to achieve a higher quality signal.

As described herein, determining whether the computing device 100 can achieve a higher quality with one network adapter over other available network adapters can be based on the at least one test performed. For example, when the computing device 100 is executing an application classified as instant, the network adapter of the network with a shorter response time compared to other network adapters of the network can be used. As described herein, a ping test can be used to determine which network adapter of the network has a shorter response time compared to other network adapters of the network.

In another example, when a computing device is executing an application classified as non-instant, the network adapter of the network with a faster throughput compared to other network adapters of the network can be used. As described herein, a FTP TpT test can be used to determine which network adapter of the network has a faster throughput speed compared to other network adapters of the network.

In the case that the computing device 100 determines there is an available network adapter of the network that will achieve a higher quality compared to other available network adapters of the network, the computing device can switch from the default network adapter to the higher performing network adapter.

Figure 2:
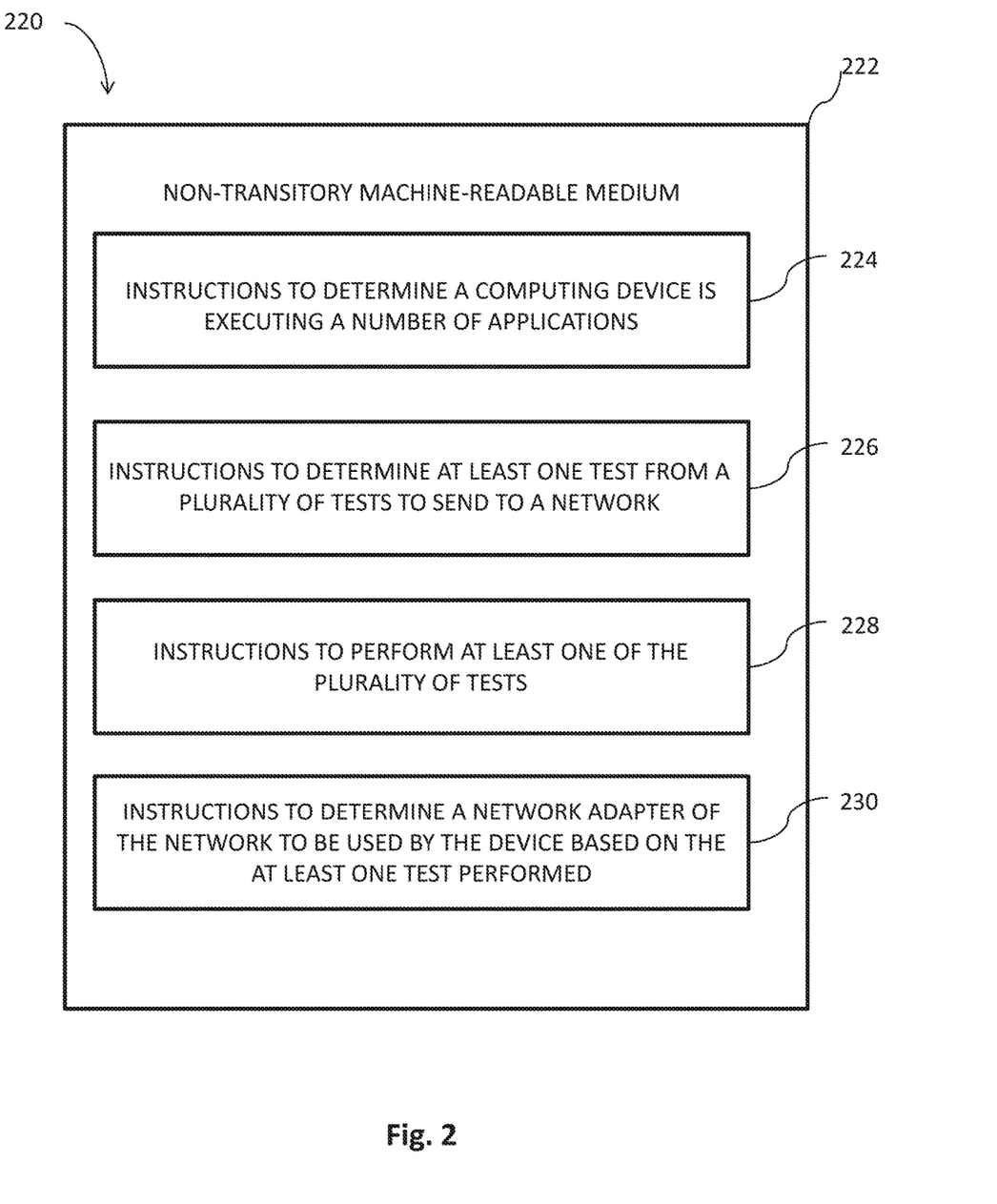
FIG. 2 is an example of a system consistent with the present disclosure.

FIG. 2 illustrates an example of system 220 for dynamic wireless network selection according to the present disclosure. System 220 may include a non-transitory machine readable storage medium 222. Non-transitory machine readable storage medium 222 may be an electronic, magnetic, optical, or other physical storage device that stores executable instructions. Thus, non-transitory machine readable storage medium 222 may be, for example, Random Access Memory (RAM), an Electrically-Erasable Programmable Read-Only Memory (EEPROM), a storage drive, an optical disc, and the like. Non-transitory machine readable storage medium 222 may be disposed within system 220, as shown in FIG. 2. In this example, the executable instructions may be "installed" on the system 220. Additionally and/or alternatively, non-transitory machine readable storage medium 222 may be a portable, external or remote storage medium, for example, that allows system 220 to download the instructions from the portable/external/remote storage medium. In this situation, the executable instructions may be part of an "installation package". As described herein, non-transitory machine readable storage medium 222 may be encoded with executable instructions for a performance threshold.

Instructions 224 may include instructions to determine a computing device is executing a number of applications. As discussed herein, in some examples, instructions 224 may include instructions to determine the number of applications being performed on the computing devices may be determined by the computing device executing a daemon. For example, a daemon can be executed in the background of the computing device to determine how many (e.g., quantity, etc.) applications the computing device is executing.

Furthermore, the daemon may classify the number of applications, as described herein. For example, a first application from the number of applications may be classified as an instant application and a second application from the number of applications may be classified as a non-instant application.

Instructions 226 may include instructions to determine at least one test from a plurality of tests to send to a network. In some examples, determining at least one test from the plurality of tests to send to the network may be based on the prioritization of the number of applications being executed by the computing device. In some examples, determining at least one test from the plurality of tests to send to the network may be based on an occurrence of roaming as a number of applications are being executed by the computing device.

In an instance that the computing device is attempting to execute multiple applications at one time, prioritization of the multiple applications may be used to determine the at least one test that is performed to determine which of the available network adapters the computing device uses. For example, in an instance where the computing device is attempting to execute both an application classified as instant and an application classified as non-instant, the application classified as instant may be given a higher priority that the application classified as non-instant. That is, the test performed may be a test to determine which network adapter will achieve a higher quality for the application that is given a higher priority.

For example, in an instance where the computing device is executing at least one application classified as instant and at least one application classified as non-instant simultaneously, the applications classified as instant can have a higher priority than the applications classified as non-instant. Thus, when determining which network adapter of the available network adapters to use, the network device that may achieve a higher quality for the applications classified as instant can be used over a network device that may achieve a higher quality for the applications classified as non-instant.

Instructions 228 may include instructions to perform at least one of the plurality of tests. As discussed herein, in some examples, instructions 228 may include instructions to perform at least one of the plurality of tests in response to a daemon, executed by the computing device, sending at least one test packet to the network. The test packets can include a ping test packet and a FTP TpT test packet.

As discussed herein, in some examples, instructions 228 may include instructions to perform a ping test as a result of the higher priority application that the computing device is attempting to execute being an instant application. The ping test may determine the network adapter with a shorter response time compared to other network adapters of the network. As discussed herein, in some examples, instructions 228 may include instructions to perform a FTP TpT as a result of the higher priority application that the computing device is attempting to execute being a non-instant application. The FTP TpT test may determine the network with a faster throughput compared to other network adapters of the network.

Instructions 230 may include instructions to determine a network adapter of the network to be used by the device based on the at least one test performed. In some examples, the computing device may utilize the network adapter with a shorter response time compared to other network adapters of the network. In some examples, the computing device may utilize the network adapter with a faster throughput compared to other network adapters of the network. As discussed herein, determining whether the computing device utilizes the network adapter with a shorter response time compared to other network adapters of the network or faster throughput compared to other network adapters of the network is based on a prioritization of the number of applications that the computing device is executing.

For example, when the computing device is executing an application classified as instant, the network adapter of the network with a shorter response time compared to other network adapters of the network can be used. As described herein, a ping test can be used to determine which network adapter of the network has a shorter response time compared to other network adapters of the network.

In another example, when a computing device is executing an application classified as non-instant, the network adapter of the network with a faster throughput compared to other network adapters of the network can be used. As described herein, a FTP TpT test can be used to determine which network adapter of the network has a faster throughput speed compared to other network adapters of the network.

The computing network can use the ping test and/or the FTP TpT test to determine whether there is an available network adapter of the network that will achieve a higher quality compared to other available network adapters of the network. In the case that the computing device determines there is an available network adapter of the network that will achieve a higher quality compared to other available network adapters of the network, the computing device can switch from the default network adapter to the higher performing network adapter.

Figure 3:
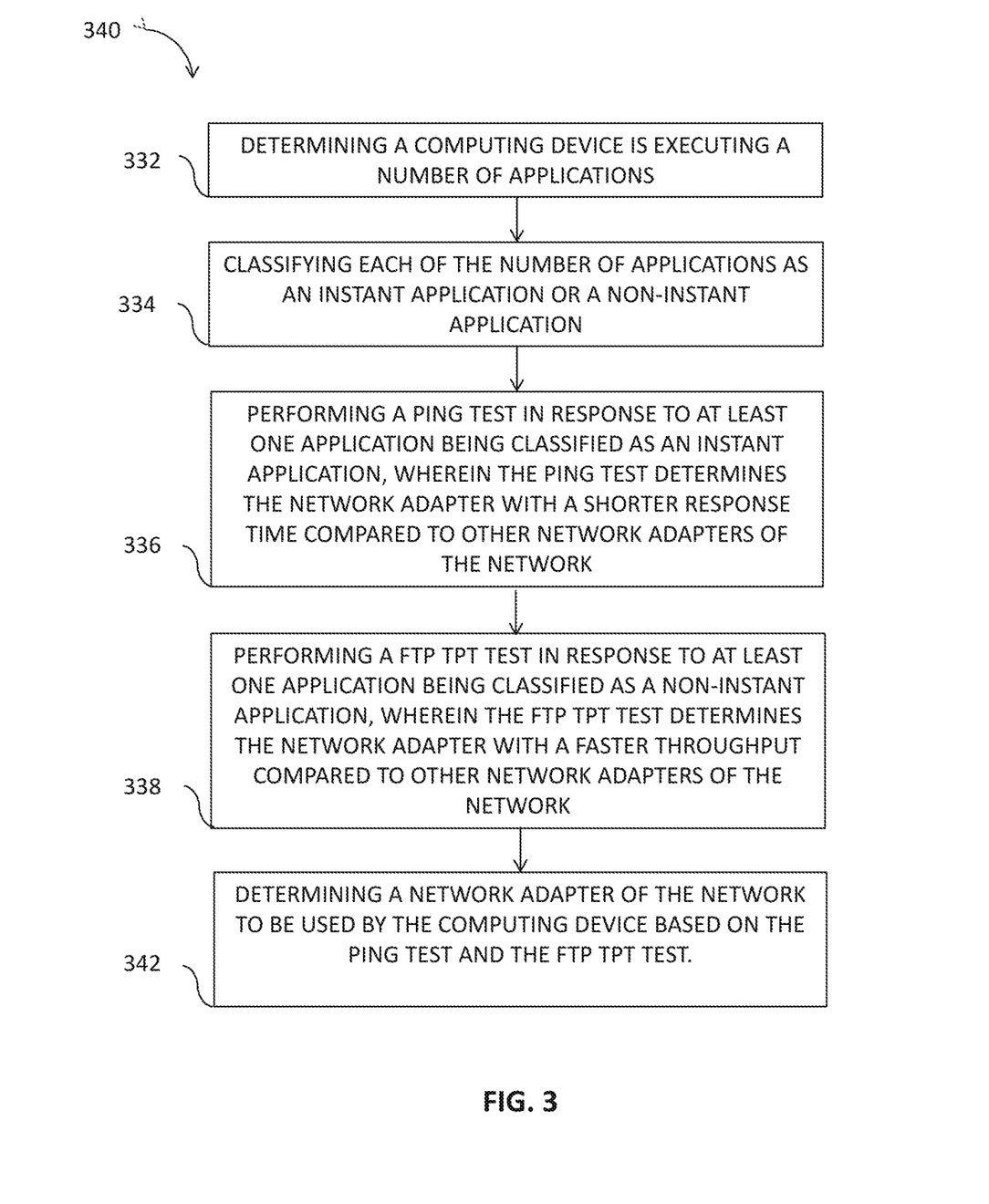
FIG. 3 illustrates an example of a method consistent with the present disclosure.

FIG. 3 illustrates an example of a method 340 for dynamic wireless network selection according to the present disclosure. In some examples, the method 340 may be performed by a computing device, as described herein. For example, the method 340 may be performed by computing device 100 as illustrated in FIG. 1.

At 332, the method 340 may include determining a computing device is executing a number of applications. For example, determining the number of applications being performed on the computing device may be determined by the computing device executing a daemon. As described herein, the daemon can be executed in the background of the computing device to determine how many (e.g., quantity, etc.) applications the computing device is executing.

At 334, the method 340 may include classifying each of the number of applications as an instant application or a non-instant application. As described herein, the computing device can prioritize the applications based on the classification of the applications. For example, an instant application can have a higher priority than a non-instant application.

At 336, the method 340 may include performing a ping test in response to at least one application being classified as an instant application, wherein the ping test determines the network adapter with a shorter response time compared to other network adapters of the network. For example, the ping test may be performed in response to a daemon sending a ping test packet to the network.

At 338, the method 340 may include performing a FTP TpT test in response to at least one application being classified as a non-instant application, wherein the FTP TpT test determines the network adapter with a faster throughput compared to other network adapters of the network. For example, the FTP TpT test may be performed in response to a daemon sending a FTP TpT test packet to the network.

At 342, the method 340 may include determining a network adapter of the network to be used by the computing device based on the ping test and the FTP TpT test. The computing network can use the ping test and/or the FTP TpT test to determine whether there is an available network adapter of the network that will achieve a higher quality compared to other available network adapters of the network. As described herein, in the case that the computing device determines there is an available network adapter of the network that will achieve a higher quality compared to other available network adapters of the network, the computing device can switch from the default network adapter to the higher performing network adapter.

Since many examples can be made without departing from the spirit and scope of the system and method of the disclosure, this specification merely sets forth some of the many possible example configurations and implementations. In the disclosure, reference is made to the accompanying drawings that form a part hereof, and in which is shown by way of illustration how a number of examples of the disclosure can be practiced. These examples are described in sufficient detail to enable those of ordinary skill in the art to practice the examples of this disclosure, and it is to be understood that other examples can be used and that process, electrical, and/or structural changes can be made without departing from the scope of the disclosure.

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processing resource.

The figures herein follow a numbering convention in which the first digit corresponds to the drawing figure number and the remaining digits identify an element or component in the drawing. For example, reference numeral 110 can refer to element "10" in FIG. 1 and an analogous element can be identified by reference numeral 210 in FIG. 2. Elements shown in the various figures herein can be added, exchanged, and/or eliminated so as to provide a number of additional examples of the disclosure. In addition, the proportion and the relative scale of the elements provided in the figures are intended to illustrate the examples of the disclosure, and should not be taken in a limiting sense.

As used herein, "a number of" an element and/or feature can refer to one or more of such elements and/or features. It is understood that when an element is referred to as being "on," "connected to", "coupled to", or "coupled with" another element, it can be directly on, connected to, or coupled with the other element or intervening elements can be present.

What is claimed:

1. A computing device, comprising:
a processing resource; and
a memory resource storing machine-readable instructions to cause the processing resource to:
determine a computing device is executing a number of applications;
classify the number of applications;
prioritize the number of applications based on the classification of the number of applications;
select a highest prioritized application from the number of applications;
responsive to selecting the highest prioritized application, determine a test from a plurality of tests to select a network adapter for the highest prioritized application to provide the highest prioritized application a network with a higher quality compared to other network adapters;
perform the test from the plurality of tests; and
determine network adapter of the network to be used by the computing device based on the test performed.

2. The computing device of claim 1, wherein a first application from the number of applications is classified as an instant application and a second application from the number of applications is classified as a non-instant application.

3. The computing device of claim 2, wherein the instant application has a higher priority than the non-instant application.

4. The computing device of claim 1, wherein the plurality of tests includes a ping test to determine the network adapter of the network with a shorter response time compared to other network adapters of the network.

5. The computing device of claim 4, wherein the ping test is performed as a result of the computing device executing an instant application.

6. The computing device of claim 1, wherein the plurality of tests includes a file transfer protocol throughput (FTP TpT) test to determine the network adapter of the network with a faster throughput compared to other network adapters of the network.

7. The computing device of claim 6, wherein the FTP TpT test is performed as a result of the computing device executing a non-instant application.

8. A non-transitory machine-readable storage medium having stored thereon machine-readable instructions to cause a computing processor to:
determine a computing device is executing a number of applications;
determine a test from a plurality of tests to send to a network;
perform the test of the plurality of tests;
determine a network adapter of the network to be used by the computing device based on the test performed;
determine that the network adapter of the network causes a weak signal compared to previous values;
prioritize the number of applications based on a classification of the number of applications;
select a highest prioritized application from the number of applications;
determine an additional test to select a different network adapter to provide a network with a higher quality compared to other network adapters for the highest prioritized application of the number of applications, responsive to selecting the highest prioritized application; and determine the different network adapter with a higher quality compared to other network adapters based on the test performed.

9. The medium of claim 8, comprising instructions to determine a test from the plurality of tests to send to the network based on the prioritization of the number of applications.

10. The medium of claim 8, comprising instructions to determine a test from the plurality of tests to send to the network based on an occurrence of roaming as the number of applications are being executed by the computing device.

11. The medium of claim 8, comprising instructions to determine when the computing device utilizes the network adapter with a shorter response time compared to other network adapters of the network or a faster throughput compared to other network adapters of the network.

12. The medium of claim 11, wherein to determine whether the computing device utilizes the network adapter with a shorter response time compared to other network adapters of the network or a faster throughput compared to other network adapters of the network is based on a prioritization of the number of applications.

13. A method comprising:

determining a computing device is executing a number of applications; classifying each of the number of applications as an instant application or a non-instant application;

performing a ping test in response to one application being classified as an instant application, wherein the ping test determines a network adapter with a shorter response time compared to other network adapters of the network;

performing a FTP TpT test in response to one application being classified as a non-instant application, wherein the FTP TpT test determines the network adapter with a faster throughput compared to other network adapters of the network;

determining a network adapter of the network to be used by the computing device based on the ping test and the FTP TpT test;

determining that the network adapter of the network causes a weak signal compared to previous values;

prioritizing the number of applications based on a classification of the number of applications;

selecting an application classified as the non-instant application having the highest prioritization;

determining a test to select a different network adapter to provide the network with a higher quality compared to other network adapters for the application classified as the non-instant application having the highest prioritization, responsive to selecting the highest prioritized application; and determining the different network adapter to provide the network with a higher quality compared to other network adapters based on the test performed.

14. The method of claim 13, wherein the number of applications being performed on the computing device is determined by the computing device executing a daemon.

15. The method of claim 13, wherein the ping test and the FTP TpT test is performed in response to a daemon sending a ping test packet and a FTP TpT test packet to the network.

* * * * *